United States Patent
Peng

(10) Patent No.: US 7,263,286 B2
(45) Date of Patent: Aug. 28, 2007

(54) FAST TESTING SYSTEM FOR OPTICAL TRANSCEIVER AND TESTING METHOD THEREOF

(75) Inventor: Jack Peng, Taoyuan (TW)

(73) Assignee: Faztec Optronics Corp., Taipei (TW)

( * ) Notice: Subject to any disclaimer, the term of this patent is extended or adjusted under 35 U.S.C. 154(b) by 767 days.

(21) Appl. No.: 10/626,615

(22) Filed: Jul. 25, 2003

(65) Prior Publication Data

US 2004/0121733 A1  Jun. 24, 2004

(30) Foreign Application Priority Data

Jul. 25, 2002 (TW) ............................. 91116558 A

(51) Int. Cl.
*H04B 10/08* (2006.01)

(52) U.S. Cl. ............ 398/22; 398/23; 398/24; 398/25; 398/26; 398/27; 398/16; 398/33; 398/135; 398/138; 398/139; 398/79; 398/45; 356/73.1; 356/218; 385/89; 714/733; 714/716; 702/106; 702/66; 702/117; 455/66.1; 455/67.11; 455/67.13

(58) Field of Classification Search ............ 398/9, 398/16, 17, 22, 23, 24, 25, 26, 79, 27, 33, 398/45, 48, 135, 138, 139; 356/73.1, 218; 384/525, 481, 486, 487; 714/733, 716; 702/106, 702/66, 117; 455/66.1, 67.11, 67.13; 385/89
See application file for complete search history.

(56) References Cited

U.S. PATENT DOCUMENTS

| 5,644,417 A * | 7/1997 | Aulet et al. ............... 398/32 |
| 6,590,644 B1 * | 7/2003 | Coin et al. ............... 356/218 |
| 2003/0081278 A1 * | 5/2003 | Chujo et al. ............... 359/110 |

* cited by examiner

*Primary Examiner*—Hanh Phan
(74) *Attorney, Agent, or Firm*—Arent Fox LLP

(57) ABSTRACT

The present invention provides a fast testing system and method for optical transceiver, which integrates multiple testing machines in the testing environment for the optical transceiver, so that the user can employ the testing system for optical transceiver for rapid and simultaneous measurement of multiple products, and further improving the production efficiency. Moreover, with a combination of optical channel selector with a set of digital communication analyzer and spectrum analyzer, a plurality of products to be tested can be switched for parametric inspection, and by combining a tree coupler to synchronously transmit the measurement signals of the standard sample to the product to be tested in a multi-port transmission to further measure the bit error ratio. Thus, the product analysis report for the user is in real-time, so as to effectively improve the competitiveness of the industry.

15 Claims, 10 Drawing Sheets

FAST TESTING SYSTEM FOR OPTICAL TRANSCEIVER AND TESTING METHOD THEREOF

BACKGROUND OF THE INVENTION

1. Technical Field

The present invention relates to a fast testing system and method for optical transceiver; and, more specifically, and by integrating multiple testing instruments that, the user can employ the testing system for the optical transceiver to rapidly and simultaneously measure multiple products, so as to improve the testing efficiency.

2. Description of Related Art

Because the best performance evaluation method for an optical transmission device is to calculate the probability of errors happened when sending bits from a transmitter to a receiver, so called the bit error ratio (BER). Normally, a bit error ratio testing system comprises a pulse pattern generator (PPG) and an error detector (ED). Referring to FIG. 1, it shows an implementation structure for the conventional testing system for the optical transceiver. The conventional testing system for the optical transceiver comprises a digital data analyzer 1 (DDA), wherein the digital data analyzer 1 (DDA) has a data input and a data output, and is integrated with pulse pattern generator 2 and the error detector 3 as a whole. When the user is conducting the actual measurement, he first use an optical transceiver as a golden sample 4, which is provided as a standard light source for other same type of optical transceiver 5 to be measured. Generally, the optical transceiver is measured under the room temperature. The optical transceiver 5 has two portions for a transmitter (Tx) and a receiver (Rx).

Next referring to FIG. 2, it shows a flowchart of the conventional testing method for the optical transceiver, which may be referred with FIG. 1. In a general testing method for the optical transceiver, a complete test for the optical transceiver must include the receiver (Rx) test and the transmitter (Tx) test. The transmitter test must be completed through the optical spectrum analyzer measurement procedure 108 and the digital communication analyzer testing procedure 109, which is first output the digital signal from the pulse pattern generator 2 to the transmitter of the optical transceiver 5 to be tested (DUT); next, transmitting the signal from the transmitter to a digital communication analyzer 7 (DCA) and an optical spectrum analyzer (OSA), in which the digital communication analyzer 7 is used to test the parameters including the average power, the extinction ratio, the jitter, the rising time, the falling time, the eye mask test and the eye width, and the optical spectrum analyzer 14 is used to test the center wavelength and the spectrum bandwidth for the optical signal.

The receiver test of the optical transceiver includes executing the procedure 101 for adjusting the input optical power, which is output a digital signal from the pulse pattern generator 2 to the transmitter of a golden sample 4, and transmitting the signal from the transmitter to an optical attenuator 6 (ATT). The optical attenuator 6 is adjusted by the user request to provide the expected attenuation for the optical signal power. An optical power meter 8 (OPM) is used to measure the input optical power of the optical transceiver 5 to be tested; and, the attenuated signal is transmitted to the receiver of the optical transceiver 5 to be tested, and to the error detector 3 for conducting the automatic testing point searching procedure 102, which is used to find the best testing point for the optical transceiver 5 to be tested; after searching the best testing point, the bit error ratio measurement procedure 103 is to measure the bit error ratio of the signal by the error detector 3 for calculating the probability of errors happened when sending bits from the transmitter to the receiver; the procedure 104 is used to determine if the measured bit error ratio of the optical transceiver 5 to be tested is completed with all the measurement conditions; if not, back to the procedure 101 for adjusting the input optical power of the next testing point; and, if so, the procedure 105 is used to calculate the sensitivity of the optical transceiver 5 to be tested.

Referring to FIG. 3, it shows the diagram for explaining the principle of the sensitivity test for the optical transceiver. When all the measurement parameters are completed, the result calculation procedure 105 is executed, which is to calculate the sensitivity 13 of the optical transceiver based on the input power and the bit error ratio for the receiver to evaluate the performance. As shown in FIG. 3, when the receiving power of the error detector 3 (ED) is reduced, the bit error rate will be increased. Because the conventional testing system and method for the optical transceiver can only measure one product at the same time, when the quantity of the product to be tested is increased, the testing time in production is also increased, so that the production efficiency is reduced, and it will be too long and waste too much time on the testing, which is not compliant to the economical cost and time efficiency.

Thus, the main object of the present invention is to provide a fast testing system and method for optical transceiver, which is a testing system and method for integrating multiple testing instruments, so that the user can use the testing system for optical transceiver to rapidly and simultaneously measure multiple products, so as to improve the testing efficiency.

SUMMARY OF THE INVENTION

In consideration of the prior art, it can only measure one product at the same time, which cannot effectively increase the quantity of testing along with the increasing of the products to be tested, and repetitive one-time measurement may make the testing time too long and waste too much time, thus the production efficiency will be reduced, and not compliant to economical cost and timely efficiency.

The present invention provides a testing system and method in the testing environment for the optical transceiver, which integrates multiple testing instruments, so that the user can employ the testing system for the optical transceiver to rapidly and simultaneously measure multiple products, so as to improve the production efficiency; in which, by combining an optical channel selector (OCS) with a set of digital communication analyzer and optical spectrum analyzer for switching multiple products to be tested for overall automatic testing, and with a tree coupler (TC) to synchronously transmit the measurement signals of the golden sample to multiple products to be tested in a multi-port transmission manner for further measuring the bit error ratio. Thus, the product analysis report for the user is in real-time, so as to effectively improve the competitiveness of the industry.

BRIEF DESCRIPTIONS OF THE DRAWINGS

DETAILED DESCRIPTION OF THE INVENTION

Although the present invention is referenced with the appended figures for the preferred embodiment in the present invention, it should be appreciated that the skilled in the present art may modify the invention described in the specification and achieve the same effect as the present invention. Thus, it should be appreciated that the following description is construed as a broad disclosure to the skilled in the present art, and the disclosure does not limit the present invention.

Figure 4:
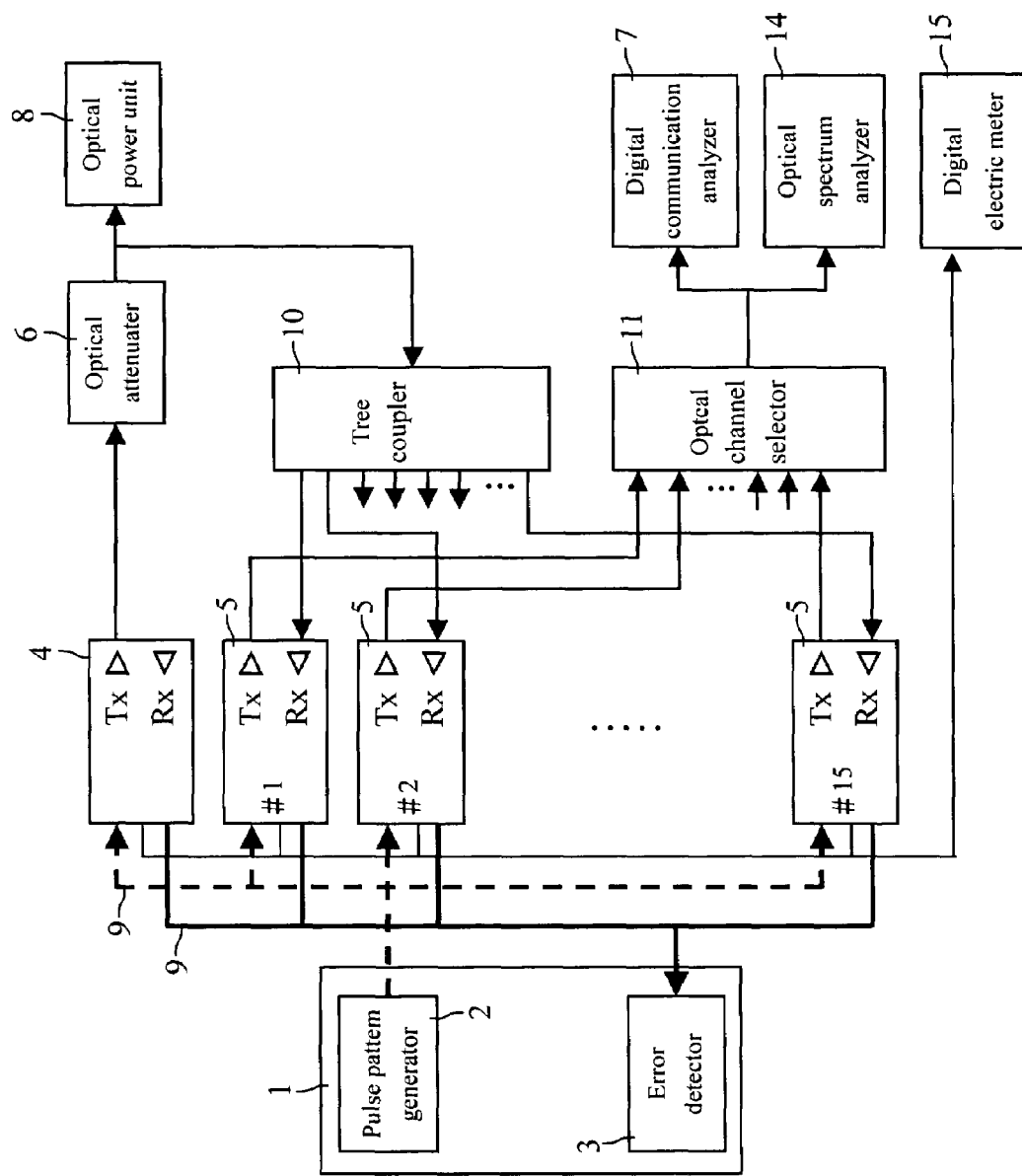
FIG. 4 is an implementation structure diagram of the fast testing system for the optical transceiver according to the present invention.

Referring to FIG. 4, it shows an implementation structure for the fast testing system of optical transceiver according to the present invention. One embodiment in the present invention uses 15 products to be tested as the testing quantity. Each product is a duplex transceiver with two optical terminals respectively for a transmitter and a receiver. As shown in FIG. 4, the fast testing system for optical transceiver according to the present invention is applied in the testing environment for optical transceivers, which can simultaneously provide the testing result of several products for the user. In the procedure of transmitting test, by combining with an optical channel selector 11, the system can measure a plurality of product to be tested; and, in the procedure of receiving test, a tree coupler 10 is used, so that the bit error ratio of the signals from multiple products to be tested can be measured simultaneously through a multiplex channel data bus 9.

In a preferred embodiment of the present invention, a fast testing system for testing a plurality of optical transceivers 5 to be tested on a testing platform comprises: a digital data analyzer 1 with multiplex channels, for outputting a digital signal to the transmitter of a standard optical transceiver 4, wherein the transmitter receives the signal outputted by the pulse pattern generator 2 and transits as the receiving samples for a plurality of optical transceivers 5 to be tested; a multiplex channel data bus 9, as the signal transmission media between the digital data analyzer 1 and the standard optical transceiver 4, and the multiple optical transceivers 5 to be tested; an optical attenuator 6, connecting with the transmitter of the standard optical transceiver sample 4 for output, and conducting the expected attenuation on the power of the optical signal transmitted by the transmitter; an optical power unit 8, which is configured at the signal output of the optical attenuator for measuring the output power of optical signal; and, a tree coupler 10, which has a transmission function of one-to-many ports for light splitting, and the signal input and output are connected to the signal output of the attenuator 6 and the receiver of each light transceiver 5 to be tested, respectively, for simultaneously transmitting the optical signals attenuated by the optical attenuator 6 to the receiver of each optical transceiver 5 to be tested, thus the error detector 3 can detect the receiver of the optical transceiver 5 to be tested through the multiplex channel data bus 9, and simultaneously measure the bit error ratio of the signal to calculate the probability of errors happened when each transmitter sending bits to the receiver, which can also test and evaluate the performance of a plurality of optical transceiver 5 to be tested.

Moreover, the fast testing system for optical transceivers according to the present invention further comprises: an optical channel selector 11, which has a many-to-one selection function, and the inputs are connected to the transmitters of the optical transceivers 5 to be tested respectively for switching the output optical signals from each optical transceiver 5 to be tested to the digital communication analyzer 7 and/or the optical spectrum analyzer 14 for measuring various parameters of the transmitter for the optical transceiver 5 to be tested; and, a digital electric meter 15, for detecting the lower voltage and high voltage of the signal detect (SD) signal for the receiver of the optical transceiver 5 to be tested.

Figure 5A:
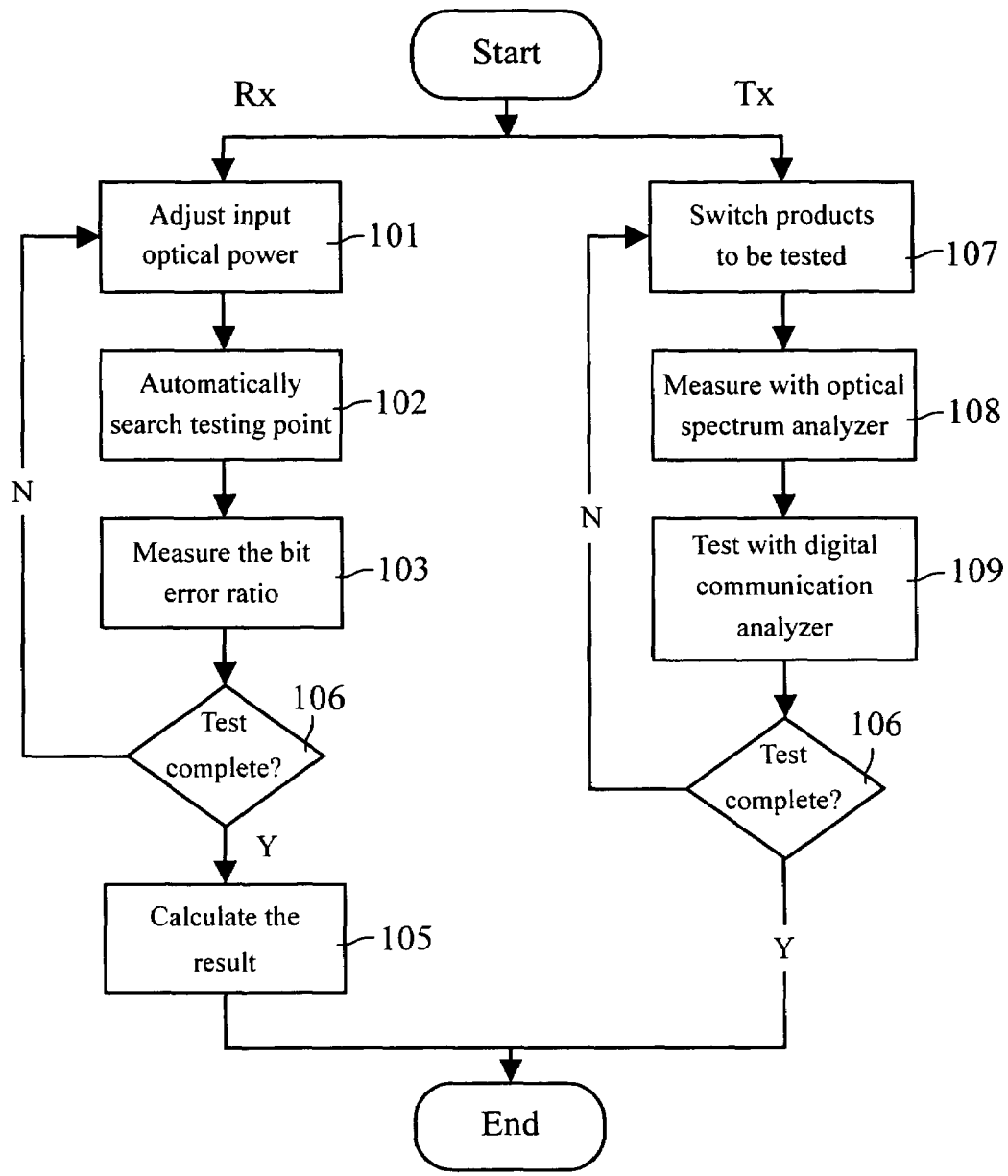
FIG. 5A is a testing flowchart for the first embodiment of the fast testing system for the optical transceiver according to the present invention.

Referring to FIG. 5A, it shows a testing flowchart of the first embodiment for the fast testing method of optical transceiver according to the present invention. Also referring to FIG. 4, the method implemented by the fast testing system of optical transceiver according to the present invention comprises the procedure of receiving test and the procedure of transmitting test. The procedure of transmitting test includes the following procedures:

Procedure 107: Switching Testing Objects

When measuring a plurality of products to be tested, the pulse pattern generator 2 is first to transmit the digital signal from the data bus 9 to the transmitters of a plurality of optical transceivers 5 to be tested, and combine an optical channel selector 11 for sequentially switching the output optical signal from each optical transceiver 5 to be tested to the digital communication analyzer 7 and/or the optical spectrum analyzer 14, and proceeding the procedure 108 for optical spectrum analyzer measurement and the procedure 109 for digital communication analyzer testing, so as to measure various parameters for the transmitter of the optical transceiver 5 to be tested.

Procedure 108: Procedure of Optical Spectrum Analyzer Measurement

This procedure is to use the optical spectrum analyzer 14 for measuring the central wavelength and bandwidth of the optical signal transmitted from the pulse pattern generator 2 through the data bus 9 to the transmitters of a plurality of optical transceivers 5 to be tested.

Procedure 109: Procedure of Digital Communication Analyzer Testing

This procedure is to use the digital communication analyzer 7 for measuring the parameters at the transmitters of a plurality of optical transceivers 5 to be tested, which including the average power, the extinction ratio, the jitter, the rise time, the falling time, the eye mask test and the eye width, and so on.

Procedure 106: Completion of Testing

This procedure is to use verify if the plurality of products to be tested are all completed with the parameter measurement for the power and wavelength of the optical signals in procedure 108 and 109 sequentially switched by the optical channel selector 11; if so, the procedure of transmission test is ended; if not, back to the procedure 107, and using the optical channel selector 11 for sequentially switching to the next product to be tested and restarting from the procedure 107, until completing the measurement for all products to be tested.

The method implemented by the fast testing system of optical transceiver according to the present invention with a procedure for receiving test (Rx) as follows:

Procedure 101: Adjusting Input Optical Power

First, the pulse pattern generator 2 outputs a digital signal to the transmitter of the standard optical transceiver sample 4, and transmitting the signal through the transmitter to an optical attenuator 6. The optical attenuator 6 is adjusted each time by the user request for expected attenuation on the optical signal power, so that the input optical power can be measured from small to large by an optical power unit 8 for the input optical power of the optical transceiver 5, and guiding the optical signal attenuated by the optical attenuator 6 to a tree coupler 10, and transmitting the optical signal with the multi-port transmission function of the tree coupler 10 to the receiver of each optical transceiver 5 to be tested, followed by the procedure 102.

Procedure 102: Automatic Testing Point Searching

This procedure is that when the optical signals are transmitted to the receivers of the plurality of optical transceivers 5 to be tested with the multi-port transmission function of the tree coupler 10, the error detector 3 can automatically search each product to be tested, and find out the best testing point.

Procedure 103: Bit Error Ratio Measurement

After completion of procedure 102, the best testing points for all optical transceivers 5 to be tested are all completed. Thus, the error detector 3 can read all the testing data at one time through the multi-channel data bus 9, which includes the light splitting operation by the coupler 10 for measuring the bit error ratio of the receiving signal and calculating the probability of errors for sending bits from the receiver of each product to be tested.

Procedure 106: Testing Completion

The procedure is to determine if the bit error ratio measured for the optical transceiver 5 to be tested is completed with sufficient testing points by the procedure 101 and 103; if not, back to the procedure 101 for adjusting the input optical power of the next testing point; if so, proceeding with the procedure 105.

Procedure 105: Result Calculation

Figure 1:
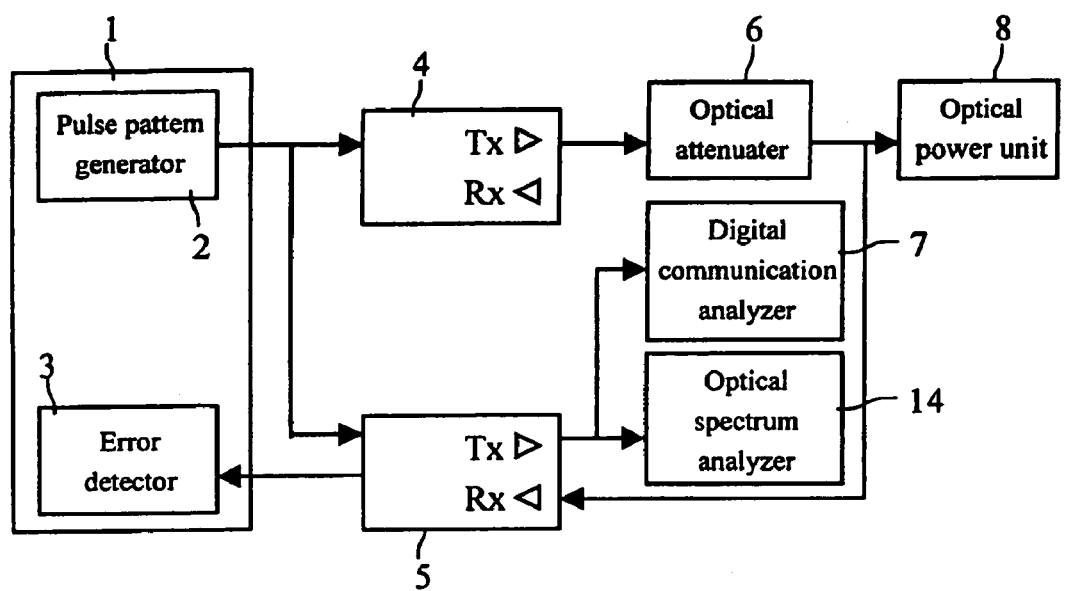
FIG. 1 is an implementation structure diagram of the conventional testing system for the optical transceiver.
Figure 2:
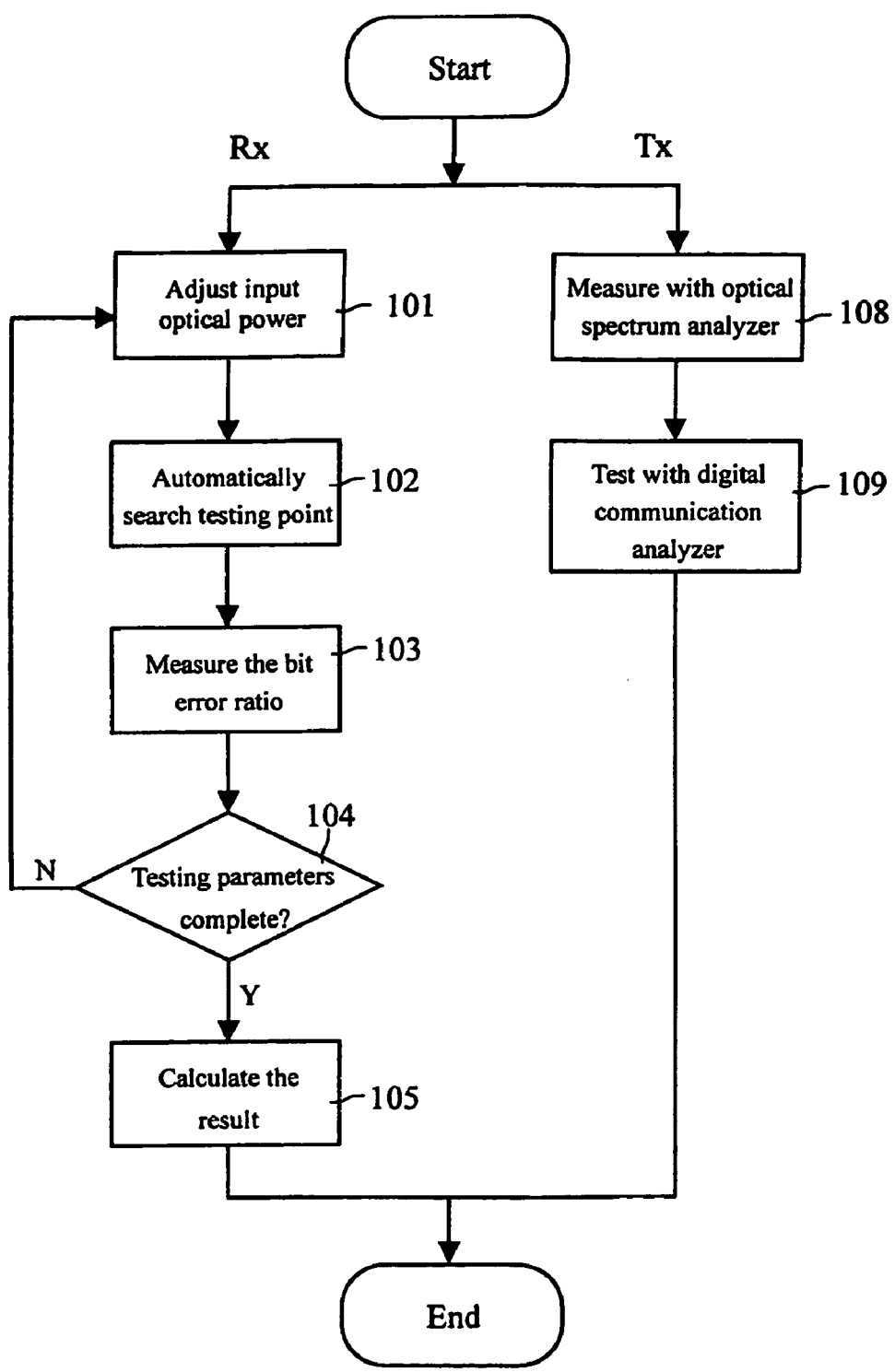
FIG. 2 is a flowchart of the conventional testing method for the optical transceiver.
Figure 3:
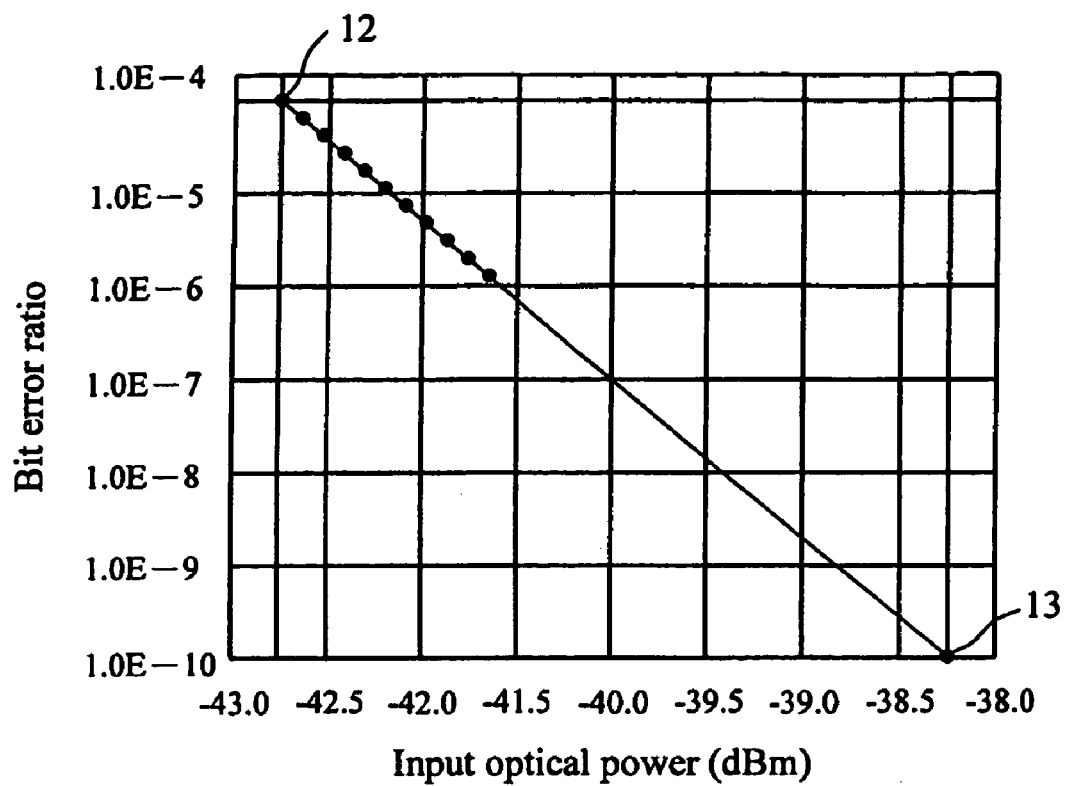
FIG. 3 is a principle diagram for the sensitivity testing for the optical transceiver.

This procedure is based on the determination with the procedure 106 for the completion of bit error ratio measurement for the optical transceivers to be tested, and to obtain a corresponding measurement parameter point according to the input power and the bit error ratio measured by the standard optical transceiver 4 and the optical transceiver 5 to be tested for calculating the sensitivity of each optical transceiver 5 to be tested, as shown in FIG. 3.

Figure 5B:
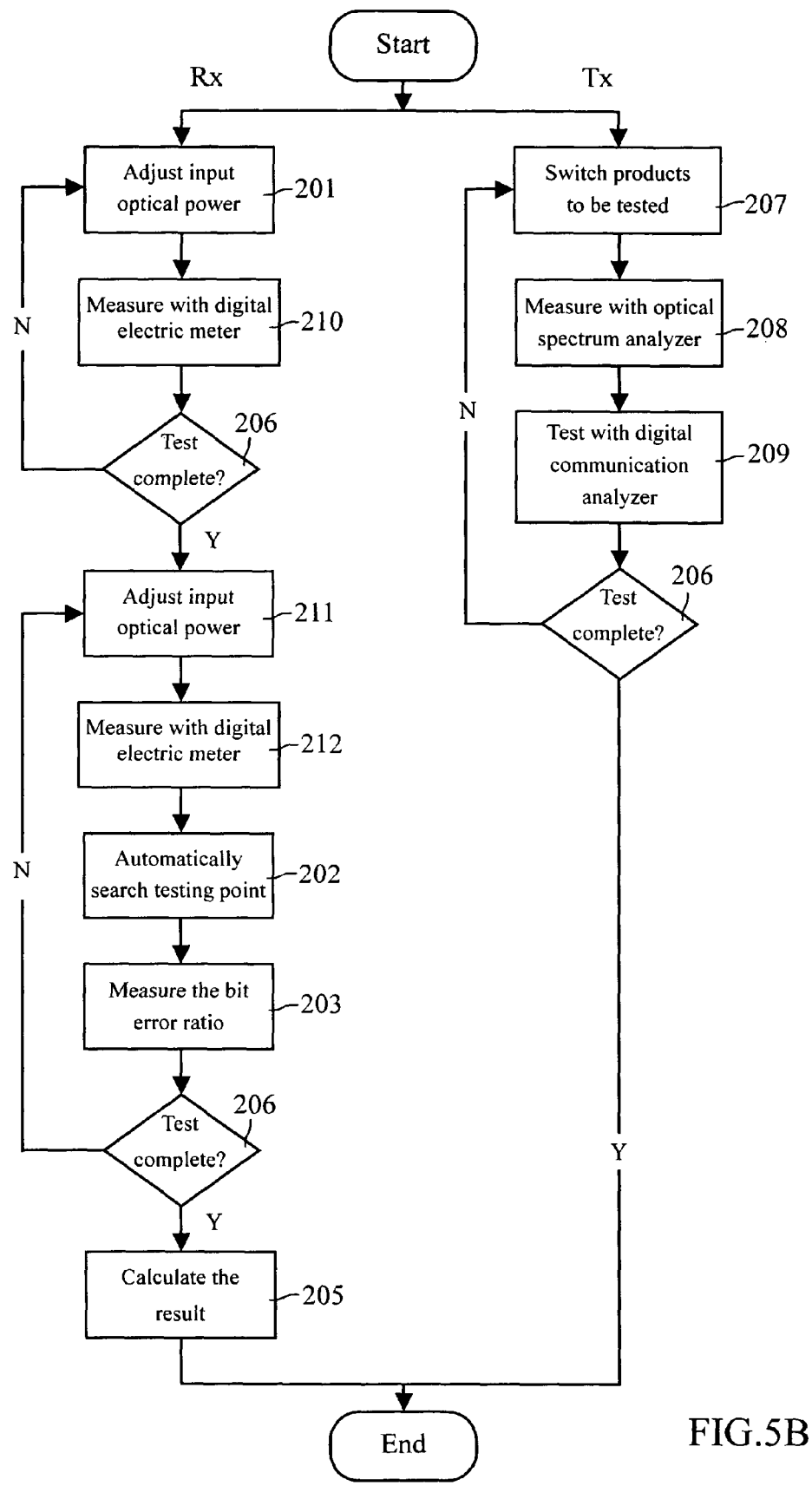
FIG. 5B is a testing flowchart for the second embodiment of the fast testing system for the optical transceiver according to the present invention.

Referring to FIG. 5B, in connection with FIG. 4 and FIG. 5A, it shows the testing flowchart of the second embodiment for the fast testing method of the optical transceiver according to the present invention, wherein the transmission testing procedure of this embodiment includes the procedures 207, 208, 209 and 206, which are identical with the procedures 107, 108, 109 and 106 included in the transmission testing procedure of the first embodiment in FIG. 5A. And, the receiving testing procedure of the second embodiment further includes measuring the parameters of SD signal for the receiver of each optical transceiver 5 to be tested, and adding a digital electric meter measuring procedure. The receiving testing procedure of the second embodiment according to the present invention includes the following procedures:

Procedure 201: Adjusting Input Optical Power

First, the pulse pattern generator 2 outputs a digital signal to the transmitter of the standard optical transceiver sample 4, and transmitting the signal through the transmitter to an optical attenuator 6. The optical attenuator 6 is adjusted each time by the user request for expected attenuation on the optical signal power, so that the input optical power can be measured from small to large by an optical power unit 8 for the input optical power of the optical transceiver 5, and guiding the optical signal attenuated by the optical attenuator 6 to a tree coupler 10, and transmitting the optical signal with the multi-port transmission function of the tree coupler 10 to the receiver of each optical transceiver 5 to be tested, followed by the procedure 210.

Procedure 210: Digital Electric Meter Measurement

Figure 6:
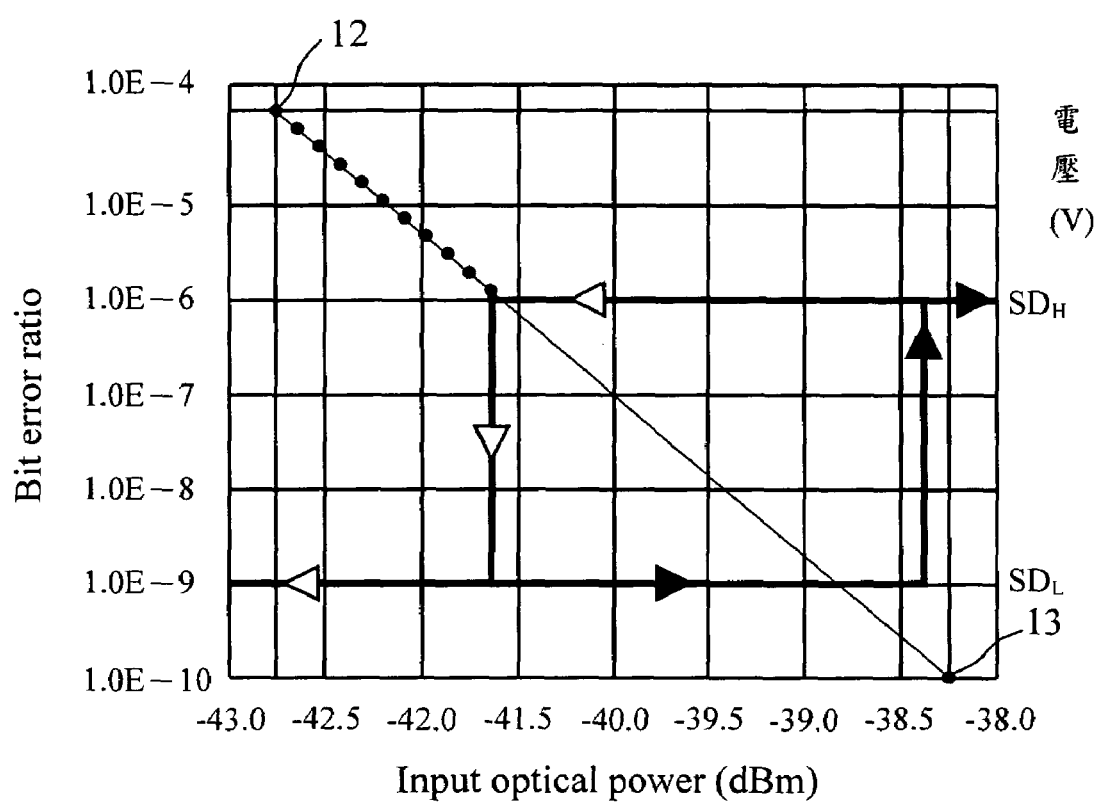
FIG. 6 is a principle diagram for the testing of SD signal and sensitivity for optical transceiver according to the present invention.

This procedure is to use a digital electric meter 15 connected with the output of the receiving terminal for each optical transceiver 5 to be tested for measuring the SD voltage parameter of the SD signal. Referring to FIG. 6, it shows a diagram of the SD signal measurement for the optical transceiver. The voltage value SD and the optical power of the SD signal for each optical transceiver 5 to be tested can be measured with the digital electric meter 15 and the optical power unit 8.

Procedure 206: Testing Completion

The procedure is to determine if the SD signal for each optical transceiver 5 to be tested is converted from H value to L value; if so, recording the voltage on the digital electric meter 15 as SDL voltage; if not, back to the procedure 201 for continuously adjusting the input optical power until the SD signal for each optical transceiver 5 to be tested is converted from H value to L value, and then recording the SDL voltage and the SDD (represented for Deasserted Signal Detect) optical power value, respectively.

Procedure 211: Adjusting Input Optical Power

The pulse pattern generator 2 outputs a digital signal to the transmitter of the standard optical transceiver sample 4, and transmitting the signal through the transmitter to an optical attenuator 6. The optical attenuator 6 is adjusted each time by the user request for expected attenuation on the optical signal power, so that the input optical power can be measured from small to large by an optical power unit 8 for the input optical power of the optical transceiver 5, and guiding the optical signal attenuated by the optical attenuator 6 to a tree coupler 10, and transmitting the optical signal with the multi-port transmission function of the tree coupler 10 to the receiver (Rx) of each optical transceiver 5 to be tested, followed by the procedure 211.

Procedure 212: Digital Electric Meter Measurement

This procedure is to use a digital electric meter 15 to measure the voltage variation of the SD signal for measuring the SDH voltage parameter, and to use the optical power unit 8 to measure the SDA (represented for Asserted Signal Detect) optical power value. Referring to FIG. 6, it shows a diagram of the SD signal measurement for the optical transceiver.

Procedure 202: Automatic Testing Point Searching

This procedure is that when the optical signals are transmitted to the receivers of the plurality of optical transceivers 5 to be tested with the multi-port transmission function of the tree coupler 10, the error detector 3 can automatically search each product to be tested, and find out the best testing point.

Procedure 203: Bit Error Ratio Measurement

After completion of procedure 202, the best testing points for all optical transceivers 5 to be tested are all completed. Thus, the error detector 3 can read all the testing data at one time through the multi-channel data bus 9, which includes the light splitting operation by the coupler 10 for measuring the bit error ratio of the receiving signal and calculating the probability of errors for sending bits from the receiver of each product to be tested.

Procedure 206: Testing Completion

The procedure is to determine if the bit error ratio measured for the optical transceiver 5 to be tested in the procedure 212 is completed, and to determine if the bit error ratio measured for each optical transceiver 5 to be tested in procedures 202 and 203 is completed with all the measurement conditions; if not, back to the procedure 211 for continuously adjusting the input optical power; if so, proceeding with the procedure 205, wherein when the procedures 202 and 203 have measured the required testing point parameters for each optical transceiver 5 to be tested, the following loops will measure the SDH voltage parameter for each optical transceiver 5 to be tested without executing the procedures 202 and 203.

Procedure 205: Result Calculation

When the loops of procedures 212, 212, 202 and 203 are completed with the bit error ratio measurement for the optical transceiver to be tested, a corresponding measurement parameter point can be obtained according to the input power and the bit error ratio measured by the standard optical transceiver 4 and the optical transceiver 5 to be tested, and calculating the sensitivity of the optical transceiver to be tested. As shown in FIG. 6, the parameter measurement for SD signal and the sensitivity measurement can be completed simultaneously.

In a preferred embodiment according to the present invention, the product measurement implemented with the testing system and method in the present invention can use a software program for execution of controlling multiple testing instruments and make an example of simultaneously measuring eight products to be tested. The testing system according to the present invention took 2.5 minutes for measuring all the products, which was 0.3 minutes for measuring one product in average. However, the prior art could only make single measurement, so that it had to repetitively measure eight products to be tested one by one, and the total measurement time was 12 minutes, which was 1.5 minutes for measuring one product in average. Thus, because the fast testing system and method for optical transceiver according to the present invention can measure multiple products simultaneously, the measurement time can be saved about 79% as compared to the prior art, and the overall productivity can be increased 4.8 times for improving the testing efficiency of the products and increasing the productivity.

Figure 7:
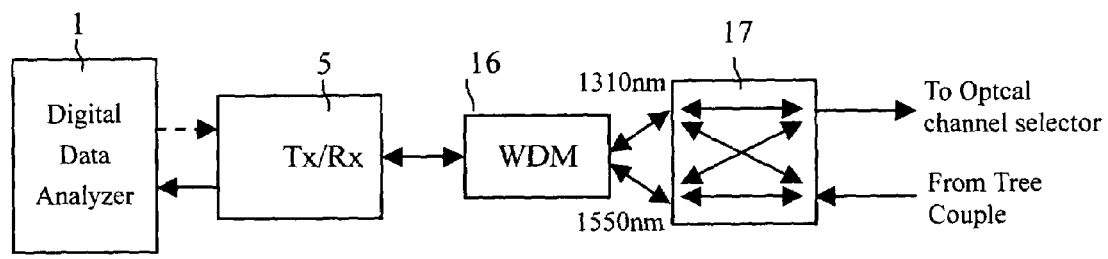
FIG. 7 is a testing block diagram for the transceiver with one common optical terminal of the fast testing system according to the present invention.

In another embodiment according to the present invention, the product measurement implemented with the testing system and method in the present invention can test a novel optical product, which is a bi-directional transceiver with one common optical terminal for a transmitter and a receiver. Such transceiver utilizes different wavelengths on the optical signals of the transmitter and receiver through the common optical terminal. In order to test such optical products, a wavelength division multiplexer (WDM) 16 and a 2×2 optical switch 17 are additionally installed on the common terminal of such optical product 5 to be tested, as shown in FIG. 7. In this embodiment, WDM 16 divides optical signals with different wavelengths 1310 nm and 1550 nm. The 2×2 optical switch 17 has a selecting signal for switching that WDM 16 receives the optical signal with 1310 nm wavelength and transmits the optical signal with 1550 nm wavelength and that WDM 16 receives the optical signal with 1550 nm wavelength and transmits the optical signal with 1310 nm wavelength. Therefore, novel products such bi-directional transceiver with one common optical terminal can be tested by the fast testing system of the present invention, which utilizes a wavelength division multiplexer 16 and a 2×2 optical switch 17 for each product to be tested.

Figure 8:
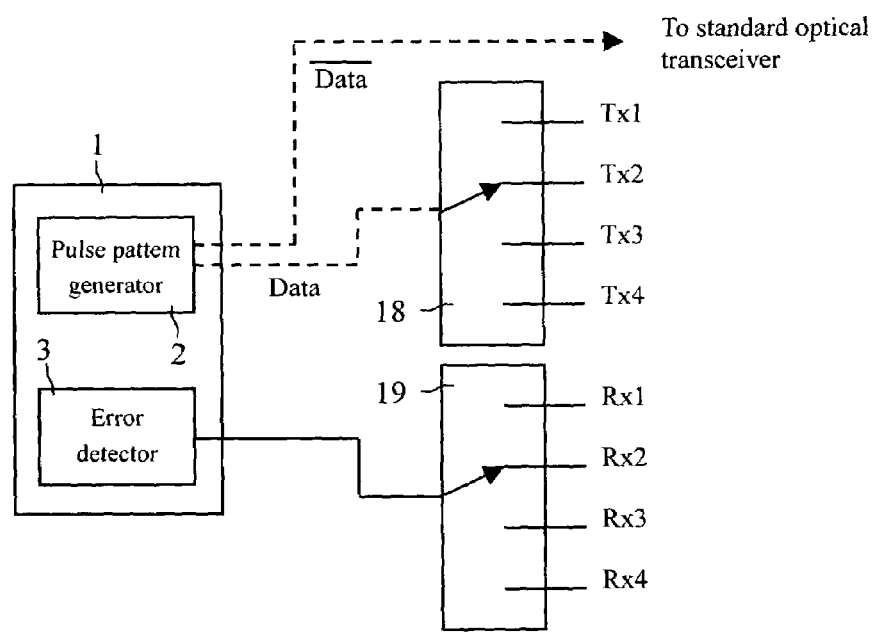
FIG. 8 is an implementation structure diagram for a digital data analyzer with one channel of the fast testing system according to the present invention.
Figure 8A:
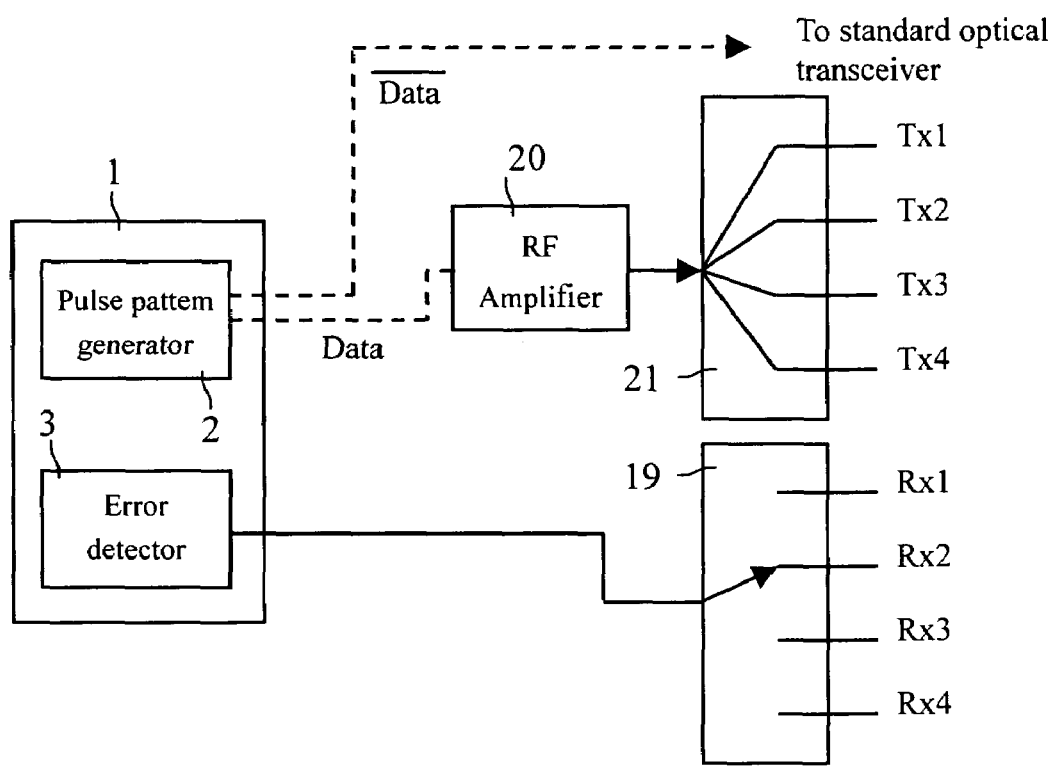
FIG. 8A is another implementation structure diagram for a digital data analyzer with one channel of the fast testing system according to the present invention.
Figure 9:
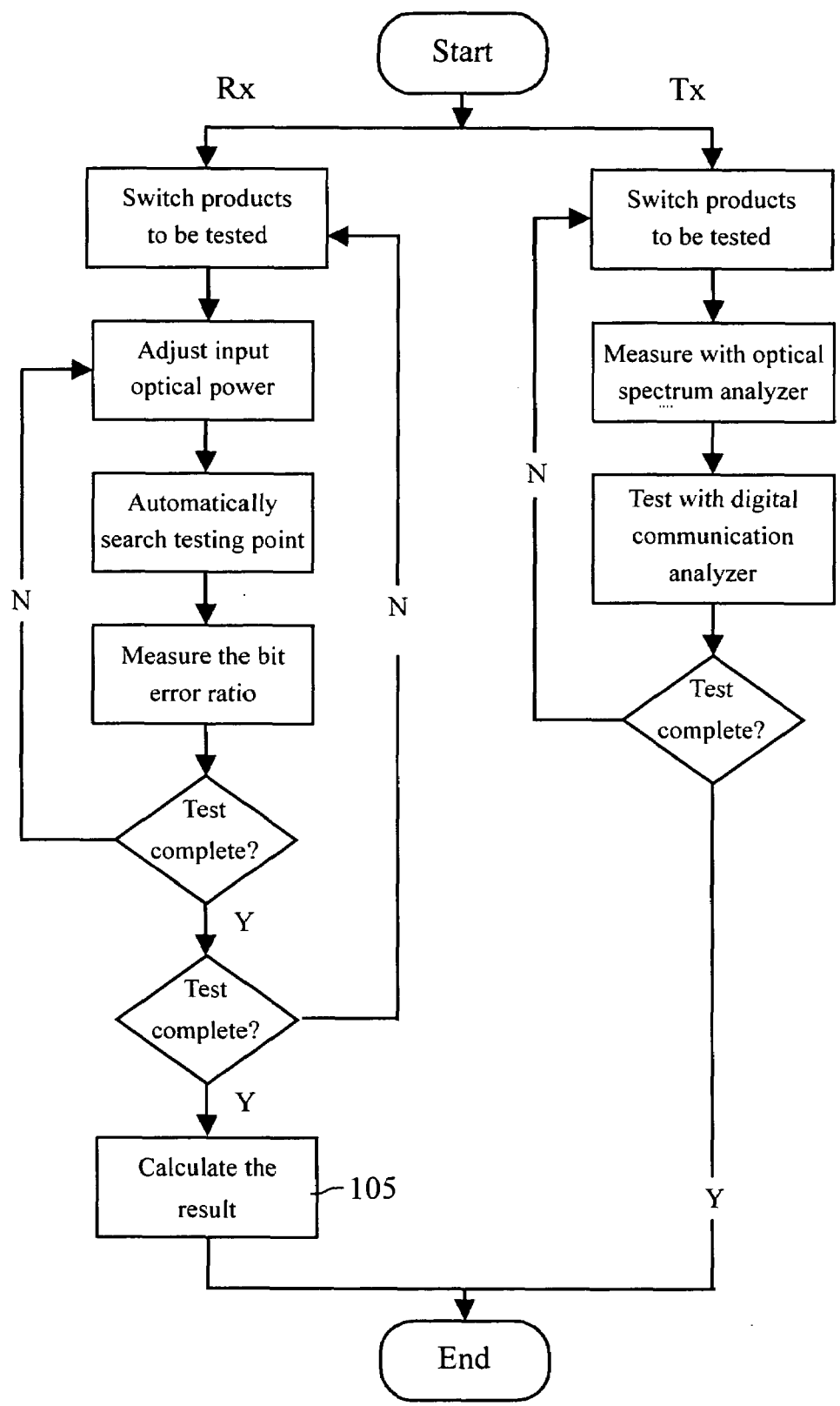
FIG. 9 is a testing flowchart of the fast testing system as shown in FIG. 8.

In another embodiment according to the present invention, a digital data analyzer with one channel can be implemented in the fast testing system of the present invention. Two RF switches 18, 19 are additionally installed on the interfaces of the digital data analyzer, as shown in FIG. 8. The RF switch 18 seriatim switches a digital signal outputted by the pulse pattern generator 2 to a plurality of optical transceivers 5 to be tested through multiplex channel data bus 9. The RF switch 18 is also replaced by RF amplifier 20 and 1 by 4 RF splitter 21, as shown in FIG. 8A. The RF switch 19 seriatim switches receiving signals of a plurality of optical transceivers 5 to the error detector 3 through multiplex channel data bus 9. An inverse of digital signal outputted by the pulse pattern generator 2 is transmitted to standard optical transceiver 4. The testing flowchart of this embodiment for the fast testing method of optical transceiver according to the present invention is shown in FIG. 9. In contrast to FIG. 5A, because the digital data analyzer with one channel is utilized, the procedure for receiving test (Rx) includes a step to switch seriatim products to be tested for performing the steps to adjust input optical power, search testing point, and measure the bit error ratio.

The fast testing system and method for the optical transceiver according to the present invention may have various advantages and features. The present invention provides a fast testing system and method for optical transceiver, which integrates multiple testing machines in the testing environment for the optical transceiver, so that the user can employ the testing system for optical transceiver for rapid and simultaneous measurement of multiple products, and further improving the production efficiency. In which, the present invention combines an optical channel selector (OCS) and a set of digital communication analyzer and optical spectrum analyzer to switch multiple products to be tested for overall automatic detection, which can reduce the total detection time accumulated for one-time detection as in the prior art.

Another advantage of the system and method in the present invention is to combine a tree coupler (TC) to simultaneously transmit the measurement signal of the standard sample in a multi-port transmission manner to the receiver of the product to be tested for further measuring the bit error ratio, so as to save the time wasted in the prior art for obtaining the diagnosis report of the product to be tested. Thus, the product analysis report obtained by the user can be in real-time, and further improving the competitiveness of the industry.

The invention claimed is:

1. A testing system for testing a plurality of optical transceivers to be tested, comprising:
   a digital data analyzer, having a pulse pattern generator and an error detector, wherein the error detector can measure the bit error ratio for the receiving signals of the optical transceivers with multiple ports;
   a standard optical transceiver, for transmitting a digital signal outputted by the pulse pattern generator with conversion as an optical signal;
   an optical attenuator, for attenuating the optical signal transmitted by the standard optical transceiver;
   a tree coupler, for sending the attenuated optical signal to the plurality of optical transceivers; and
   an optical channel selector, for switching the plurality of optical transceivers one by one for receiving the optical signal converted from the digital signal to measure the power and waveform of the optical signal.

2. The testing system of claim 1, wherein the optical transceiver comprises a receiver and a transmitter.

3. The testing system of claim 2, wherein the tree coupler has an input connected to the signal output of the optical attenuator, and an output connected to the receivers of the plurality of optical transceivers to be tested.

4. The testing system of claim 1, wherein the digital data analyzer has a multiplex channel data bus, which can send the digital signals to the transmitters of the plurality of optical transceivers to be tested, and measure the bit error ratio for the receiving signals of the plurality of optical transceivers to be tested with multiple ports.

5. The testing system of claim 1, wherein the optical channel selector is to switch the optical signals transmitted by the plurality of optical transceivers to be tested one by one to a digital communication analyzer and an optical spectrum analyzer for finding out the parameter testing for each optical transceiver to be tested.

6. The testing system of claim 5, wherein the digital communication analyzer and the optical spectrum analyzer are configured at the signal output of the optical channel selector.

7. The testing system of claim 1, further comprising a wavelength division multiplex and a 2×2 optical switch for each optical transceiver to be tested, which is a bi-directional transceiver with one common optical terminal for a transmitter and a receiver.

8. A testing system for testing a plurality of optical transceivers to be tested, each optical transceiver has a receiver and a transmitter, comprising:
   a tree coupler, for sending a standard optical signal to the receivers of the plurality of optical transceivers;
   an optical channel selector, for switching the plurality of optical transceivers to be tested one by one for receiving an optical signal converted from a digital signal to measure the power and waveform of the optical signal; and
   a digital data analyzer, having a pulse pattern generator and an error detector, wherein the standard optical signals comprise the digital signals outputted from the pulse pattern generator, and the error detector can measure the bit error ratio for the receiving signals of the plurality of optical transceivers.

9. The testing system of claim 8, further comprising a wavelength division multiplex and a 2×2 optical switch for each optical transceiver to be tested, which is a bi-directional transceiver with one common optical terminal for a transmitter and a receiver.

10. The testing system of claim 8, wherein the digital data analyzer has a multiplex channel data bus, which can send the digital signals to the transmitters of the plurality of optical transceivers to be tested, and measure the bit error ratio for the receiving signals of the plurality of optical transceivers to be tested with multiple ports.

11. The testing system of claim 8, wherein the optical channel selector is to switch the optical signals transmitted by the plurality of optical transceivers to be tested one by one to a digital communication analyzer and an optical spectrum analyzer for finding out the parameter testing for each optical transceiver to be tested.

12. The testing system of claim 8, wherein the digital data analyzer with one channel is applied, two RF switches are installed on the interfaces of the pulse pattern generator and the error detector for switching a plurality of optical transceivers to be tested.

13. The testing system of claim 8, wherein the digital data analyzer with one channel is applied, a RF amplifier and RF splitter are installed on the interface of the pulse pattern generator for driving a digital signal to optical transceivers to be tested, and a RF switch is installed on the interface of the error detector.

14. A testing method for testing a plurality of optical transceivers to be tested, the method comprises at least the following steps:
   using an optical channel selector for switching the optical signals converted by the plurality of optical transceivers one by one to measure the power and waveform of the optical signal; and
   using a tree coupler to send a standard optical signal to the receivers of the plurality of optical transceivers, and using an error detector to measure the bit error ratio for the receiving signals of the plurality of optical transceivers with multiple ports
   wherein the step of using the optical channel selector comprises: the optical channel selector switching the optical signals one by one to a digital communication analyzer and an optical spectrum analyzer for finding out the parameter testing for each optical transceiver to be tested.

15. A testing method for testing a plurality of optical transceivers to be tested, the method comprises at least the following steps:
   using an optical channel selector for switching the optical signals converted by the plurality of optical transceivers one by one to measure the power and waveform of the optical signal; and
   using a tree coupler to send a standard optical signal to the receivers of the plurality of optical transceivers, and using an error detector to measure the bit error ratio for the receiving signals of the plurality of optical transceivers with multiple ports, wherein the step of using the tree coupler comprises: a digital signal outputted from a pulse pattern generator being converted into the standard optical signal through a standard optical transceiver.

* * * * *